United States Patent [19]

Stokes et al.

[11] Patent Number: 4,575,587
[45] Date of Patent: Mar. 11, 1986

[54] SIGNAL WRAP FOR TRANSDUCER FAULT ISOLATION

[75] Inventors: Rembert R. Stokes, Austin, Tex.; David J. Priniski, Barrington, Ill.

[73] Assignee: Motorola, Inc., Schaumburg, Ill.

[21] Appl. No.: 653,626

[22] Filed: Sep. 24, 1984

[51] Int. Cl.⁴ .................... H04M 1/24; H04R 29/00
[52] U.S. Cl. ................................................ 179/175.1 A
[58] Field of Search ............... 179/175.11, 175.1 R, 179/175, 175.1 A; 340/635, 653

[56] References Cited

U.S. PATENT DOCUMENTS

| | | | |
|---|---|---|---|
| 2,982,942 | 5/1961 | White | 73/645 |
| 3,261,926 | 7/1966 | Bryant et al. | 179/175.1 A |
| 3,859,984 | 1/1975 | Langley | 73/641 |
| 4,037,222 | 7/1977 | Solomon | 340/261 |
| 4,229,978 | 10/1980 | Sholl et al. | 73/626 |

FOREIGN PATENT DOCUMENTS 2357121 3/1978 France .................. 179/175.1 A

OTHER PUBLICATIONS

"C-MOS Chip Set Gives New Life to Twisted Pairs for Local Networks", Electronics Magazine Sep. 22, 1982, pp. 125-130, by H. Wursburg and G. Hillman.

Primary Examiner—Stafford D. Schreyer
Attorney, Agent, or Firm—Phillip H. Melamed; William J. Kubida

[57] ABSTRACT

A signal wrap for transducer fault isolation for use in a telephone system providing remote isolation and identification of malfunctions in end-user telephone equipment such as a handset microphone and handset receiver (earpiece speaker) with an associated sound source and sound receiver.

22 Claims, 7 Drawing Figures

| FAILED COMPONENT | FAILED TEST |
|---|---|
| $R_H$ | 1 |
| $M_H$ OR CORD | 1 & 2 |
| R | 2 |

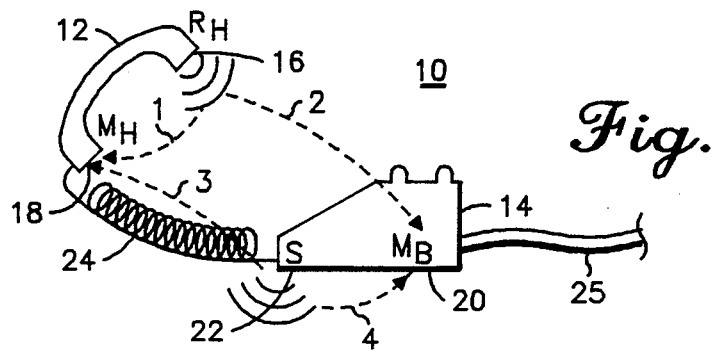
Fig. 1A
Fig. 1B
| FAILED COMPONENT | FAILED TEST |
|---|---|
| $R_H$ | 1 & 2 |
| S | 3 & 4 |
| $M_H$ | 1 & 3 |
| $M_B$ | 2 & 4 |
| CORD | 1,2 & 3 |
Fig. 2A
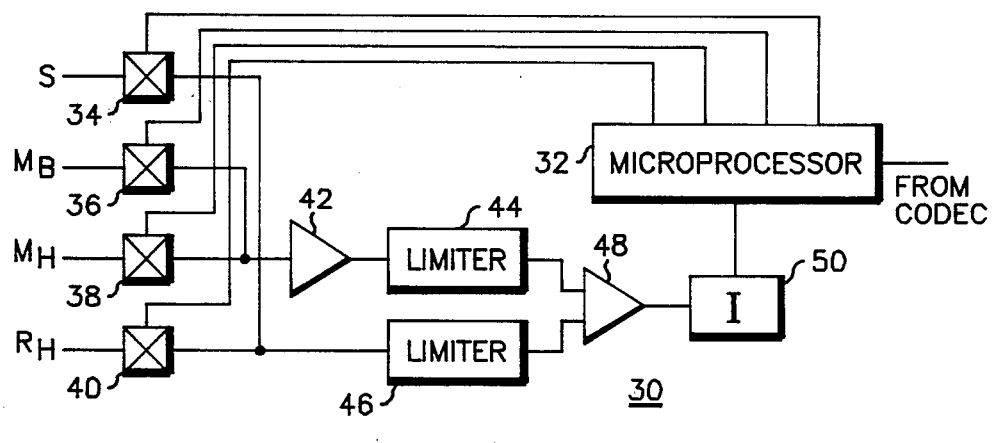
Fig. 2B

| FAILED COMPONENT | FAILED TEST |
|---|---|
| $R_H$ | 1 |
| $M_H$ OR CORD | 1 & 2 |
| R | 2 |

SIGNAL WRAP FOR TRANSDUCER FAULT ISOLATION

BACKGROUND OF THE INVENTION

The present invention relates, in general, to the field of signal wraps for transducer fault isolation. More particularly, the present invention relates to a signal wrap for a telephone station for remote isolation and identification of malfunctions in end-user telephone equipment such as a handset microphone and handset receiver and an associated sound source and hand receiver. The term "handset receiver", as used herein, refers to the handset earpiece speaker device which receives electrical signals and provides acoustic signals in response thereto.

In fault isolation and error detection, techniques have been developed in conventional circuitry to wrap an incoming signal and return it to a return path for A-B comparison. From this information, deduction can be made about the proper operation of the involved circuit. By partitioning the circuit, more complete information can be derived. This technique can be applied to telephone circuits but it has not heretofore been applied to the transducers of the telephone itself.

A major problem in the telephone industry is that the provider of the service, in this case the telephone company, can easily determine whether their in-office equipment is working, but a greater problem is presented in determining the operating condition of equipment at the other end of the line. Expense in time, money and effort is involved in sending a repairman to determine the operating condition of a user's telephone handset, cord etc. While the telephone company has been able to send a ringing signal to test the impedance of the interconnecting line, such a wrap signal does not check the handset itself. As is obvious, it is simply not feasible to call the user and inquire as to the operating condition of his telephone, especially if it isn't working, or no one was at home.

SUMMARY OF THE INVENTION

It is therefore an object of the present invention to provide a signal wrap for transducer fault isolation.

It is further an object of the present invention to provide an improved signal wrap for transducer fault isolation which allows for nonintrusive testing of a user's telephone equipment from a central control location or user station.

It is still further an object of the present invention to provide an improved signal wrap for transducer fault isolation which allows for remote testing of signal transmitting and receiving transducers in a telephone system.

The foregoing and other objects are achieved in the present invention wherein there is provided a telephone station having a fault isolation system for a telephone including a handset receiver and handset microphone with an associated sound source. First means are provided for causing the handset receiver to produce a first acoustic signal to the handset microphone. Second means are provided for causing the sound source to produce a second acoustic signal to the handset microphone and logic means permutationally associate selected ones of the first and second acoustic signals whereby the handset receiver and sound source may be considered defective if either the first or second acoustic signals is not respectively detected by the handset microphone, and the handset microphone may be considered defective if both the first and the second acoustic signals are not detected thereby.

A method is also provided for fault isolation in a system having first and second transmitting transducers and a third receiving transducer which comprises the steps of firstly activating the first transmitting transducer to produce a first signal to the receiving transducer; secondly activating the second transmitting transducer to produce a second signal to the receiving transducer and permutationally associating the signals produced in response thereto. In operation, the first or second transmitting transducers may be considered defective if either the first or second signal is not respectively detected by the third transducer and the third transducer may be considered defective if both the first and second signals are not detected thereby.

A telephone station in accordance with the present invention has a fault isolation system for a telephone including a handset receiver and handset microphone and an associated sound source and sound receiver. The system includes first means for causing the handset receiver to produce first and second acoustic signal portions to the handset microphone and sound receiver respectively. Second means are provided for causing the sound source to produce third and fourth acoustic signal portions to the handset microphone and sound receiver respectively. Logic means permutationally associate selected ones of the first, second, third and fourth acoustic signals. In operation, the handset receiver may be considered defective if the first and second acoustic signal portions are not detected by the handset microphone and sound receiver, the sound source may be considered defective if the third and fourth acoustic signal portions are not detected by the handset microphone and sound receiver, the handset microphone may be considered defective if the first and third acoustic signal portions are not detected thereby, and the sound receiver may be considered defective if the second and fourth acoustic signal portions are not detected thereby.

A method for fault isolation in a system having first and second transmitting transducers and third and fourth receiving transducers comprises the steps of firstly activating the first transmitting transducer to produce first and second signal portions to the third and fourth receiving transducers respectively. The second transmitting transducer is secondly activated to produce third and fourth signal portions to the third and fourth receiving transducers respectively. In accordance with the method, the first transmitting transducer may be considered defective if the first and second signal portions are not detected at the third and fourth receiving transducers, the second transmitting transducer may be considered defective if the third and fourth signal portions are not detected by the third and fourth receiving transducers, the third receiving transducer may be considered defective if the first and third signal portions are not detected thereby, and the fourth receiving transducer may be considered defective if the second and fourth signal portions are not detected thereby.

BRIEF DESCRIPTION OF THE DRAWINGS

The above-mentioned and other features and objects of the present invention and the manner of attaining them will become more apparent and the invention itself will be best understood by reference to the following description of an embodiment of the invention taken in conjunction with the accompanying drawings, wherein:

FIG. 1A is a simplified representational illustration of a telephone including a handset and base having an associated microphone and speaker;

FIG. 1B is a tabular representation of a signal wrap for transducer fault isolation of the telephone of FIG. 1A;

FIG. 2A is a simplified schematic diagram of a fault isolation system; in accordance with the present invention for performing the signal wrap for transducer fault isolation of FIGS. 1A and 1B;

FIG. 2B illustrates representative waveforms for portions of the fault isolation system of FIG. 2A;

DESCRIPTION OF A PREFERRED EMBODIMENT

Figure 3:
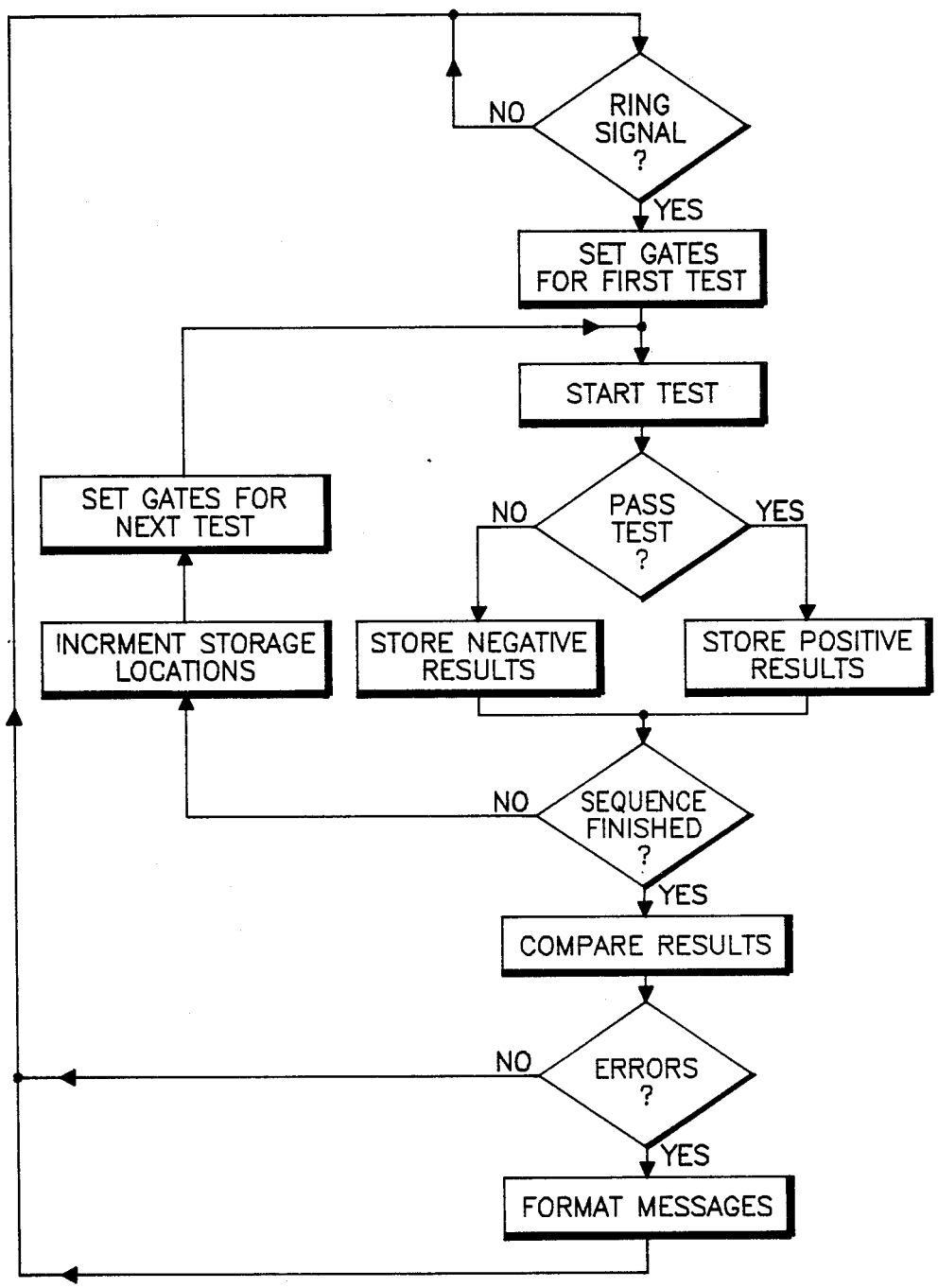
FIG. 3 is a logic flow diagram for operatively controlling the fault isolation system of FIGS. 2A and 2B.

With reference to FIG. 1A, a telephone 10 which may be tested for transducer fault isolation by the signal wrap of the present invention is shown. Telephone 10 includes handset 12 and base 14. Handset 12 includes a conventional receiver (earpiece speaker) 16 ($R_H$) and microphone 18 ($M_H$). Handset 12 is electrically connected to base 14 by means of cord 24. Base 14 further includes an additional microphone 20 ($M_B$) functioning as a sound receiver and a speaker 22 (S) functioning as a sound source. The base receives electrical signals from and sends electrical signals to a central telephone exchange location via conventional telephone wiring 25. As illustrated, a first signal of acoustic energy is radiated from receiver 16 to microphone 18 of handset 12 whereupon a second acoustic signal may be simultaneously or sequentially directed to microphone 20 of base 14. In like manner, a third acoustic signal is directed to microphone 18 of handset 12 whereupon a fourth acoustic signal would be directed to microphone 20 in base 14.

With reference additionally to FIG. 1B, a tabular representation of a signal wrap for fault isolation of the transducers of telephone 10 is shown. During the silent intervals of a ringing signal, when a customer expects telephone 10 to make a noise, the signal wrap of the present invention can be imposed and a unique identification of any failed transducers of telephone 10 can be determined. This signal wrap may be conducted between the bursts of ringing energy so that microphones 18 and 20 will be able to distinguish the lower level sound energy coming from receiver 16 and speaker 22 as opposed to the higher ringing sound level. It should also be noted that the telephone ringer (not shown) may also function as a sound source to perform the signal wrap of the present invention as hereinafter described.

For example, should the first and second acoustic signals transmitted from handset receiver 16 not be respectively received by microphone 18 and microphone 20, it may be inferred that handset receiver 16 has failed if the third and fourth acoustic signals from the speaker 22 to the microphone 18 and microphone 20 are received. Should the third and fourth acoustic signals which are to be transmitted from speaker 22 not be respectively received by microphone 18 and microphone 20, it may be inferred that speaker 22 has failed if the first and second acoustic signals are received. Similarly, should the first and third acoustic signals transmitted from handset receiver 16 and speaker 22 respectively not be received by microphone 18, but received by microphone 20, it may be inferred that microphone 18 has failed. In like manner, should the second and fourth acoustic signals transmitted from receiver 16 and speaker 22 not be respectively detected by microphone 20, but be detected by microphone 18, it may be inferred that microphone 20 has failed. Finally, should the first and second acoustic signals transmitted from handset receiver 16 and the third acoustic signal transmitted from speaker 22 not be received by microphone 18 and microphone 20, but the fourth signal from speaker 22 to microphone 20 be received, it may be inferred that cord 24 has failed between handset 12 and base 14.

It should be noted, that while a single test could be failed due to sensitivity problems, two failures are unlikely unless there is indeed a bad transducer. Thus by preferably providing, in FIG. 1B, for at least two failures in order to determine the existence of a fault, more reliable fault detection is provided.

Referring additionally now to FIGS. 2A and 2B, a fault isolation system 30 useful in performing the signal wrap for transducer fault isolation of the present invention in conjunction with telephone 10 is shown. Fault isolation system 30 includes a number of analog gates 34, 36, 38 and 40 having as inputs the electrical signals appearing at speaker 22, microphone 20, microphone 18 and handset receiver 16 respectively. The electrical signals at speaker 22 and handset receiver 16 produce corresponding acoustic signals, while the electrical signals at microphones 20 and 18 are produced in response to received acoustic signals. Analog gates 34, 36, 38, and 40 are operably controlled by means of respective outputs from microprocessor 32 having as a control input a signal from a Codec (a coder-decoder) which may be part of a central telephone exchange system. The output of analog gates 34, 40 are applied to an input of limiter 46 while the output of analog gates 36, 38 are inverted by means of inverting amplifier 42 for input to limiter 44. The output of limiters 44, 46 is applied to respective inputs of summing amplifier 48 having its output connected to an input of integrator 50. The output of intergrator 50 is supplied as input to microprocessor 32.

In operation, fault isolation system 30 provides a logic system for permutationally associating selected ones of the first, second, third and fourth acoustic signals above described with respect to telephone 10. The truth table signal wrap for transducer fault isolation shown in FIG. 1B can be implemented under the control of microprocessor 32 to provide a unique error message to identify which transducer of telephone 10 has failed. Microprocessor 32 receives an incoming "ring" signal from a Codec and initiates a test or signal wrap sequence stored in its memory. Analog gates 34, 36, 38 and 40 are activated by way of microprocessor 32 control lines and allow sequential comparison of pairs of the various signals at the gates. Inverting amplifier 42 is added in the path from microphones 18, 20 to allow for compensation in signal levels due to acoustical losses between the sound sources 16 and 22 and sound receivers 18 and 20. The signals are then limited by means of limiters 44, 46 and summed by means of summing amplifier 48. A logic low output means the test has been passed. The output of summing amplifier 48 passes through integrator 50 before being input to microprocessor 32. This allows for a "clean" logic level 1 or logic level 0 to be presented to microprocessor 32. Integrator 50 could therefore be nothing more than a capacitor.

FIG. 2B shows the results of two possible conditions for testing handset receiver 16. As microprocessor 32 enables the pairs of analog gates 40 and 38 and then 40 and 36, a series of either logic high or logic low signals would be input to microprocessor 32. At the end of the test sequence, the results would be compared to an internal memory table and a unique error message could be formatted to identify the failed transducer.

Referring additionally now to FIG. 3, a logic flow diagram for implementing a signal wrap for transducer fault isolation in accordance with the present invention for implementation by microprocessor 32 of fault isolation system 30 is shown. A ringing signal input to microprocessor 32 implements the setup of analog gates 34, 36, 38 and 40 at which time a test is initiated. The results of passed and failed tests are stored and the test sequence is repeated until finished. Results of the tests are compared to a table within the memory of microprocessor 32 for ultimate output of an error message should a failed transducer have been indicated.

Figures 4A, 4B:
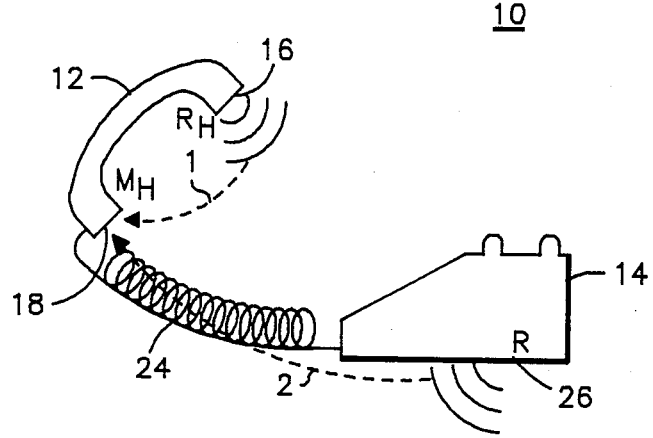
FIG. 4A is a simplified representational view of a telephone including a handset and a ringer functioning as an associated sound source.
FIG. 4B is a tabular representation of a signal wrap for transducer fault isolation of the telephone of FIG. 4A.

Referring additionally now to FIGS. 4A and 4B, a telephone 10 is shown including a ringer 26 (R) functioning as an associated sound source. In this implementation of a signal wrap for transducer fault isolation in accordance with the present invention a first acoustic signal is transmitted from handset receiver 16 to microphone 18 of handset 12 while a second acoustic signal is transmitted from ringer 26 located in base 14 to microphone 18 of handset 12. Cord 24 interconnects handset 12 to base 14.

In operation, handset receiver 16 may be deemed to have failed if only the first acoustic signal is not received by microphone 18. Microphone 18 or cord 24 may be deemed to have failed if the first and second acoustic signals from handset receiver 16 and ringer 26 are not received. Similarly, ringer 26 may be deemed to have failed if only the second acoustic signal is not received by microphone 18.

What has been provided therefore is an improved signal wrap for transducer fault isolation. The improved signal wrap for transducer fault isolation of the present invention allows for nonintrusive testing of a user's telephone equipment from a central control location or user station. The signal wrap of the present invention also allows for remote testing of signal transmitting and receiving transducers in a telephone system.

While there have been described above the principles of the invention in conjunction with specific apparatus, it is to be clearly understood that this description is made only by way of example and not as a limitation to the scope of the invention. That is, the signal wrap of the present invention can be conducted with five elements (the handset receiver and microphone, the set (base) speaker and microphone as well as the ringer), in which instance six acoustic signals would be produced for subsequent analysis.

We claim:

1. A telephone station having a fault isolation system for a telephone including a handset receiver and handset microphone and an associated sound source and sound receiver, said handset microphone and sound receiver receiving acoustic signals and, if properly operative. detecting them by producing corresponding electrical signals, said system comprising:

first means for causing said handset receiver to produce first and second acoustic signal portions to said handset microphone and sound receiver, respectively, for detection by providing corresponding electrical signals, respectively;

second means for causing said sound source to produce third and fourth acoustic signal portions to said handset microphone and sound receiver respectively for detection by providing corresponding electrical signals; and logic means for permutationally associating selected ones of the electrical signals resulting from reception of said first, second, third and fourth acoustic signals by said handset microphone and sound receiver, and determining the occurrence of faults in said handset receiver, handset microphone, sound source and sound receiver;

whereby said handset receiver may be considered defective if said first and second acoustic signal portions are not detected by said handset microphone and sound receiver but said third and fourth acoustic signal portions are detected, said sound source may be considered defective if said third and fourth acoustic signal portions are not detected by said handset microphone and sound receiver but said first and second acoustic signal portions are detected, said handset microphone may be considered defective if said first and third acoustic signal portions are not detected thereby but said second and fourth acoustic signal portions are detected by said sound receiver, and said sound receiver may be considered defective if said second and fourth acoustic signal portions are not detected thereby but said first and second acoustic signal portions are detected by said handset microphone.

2. The telephone station of claim 1 wherein said system comprises a microprocessor controlled fault isolation system.

3. The telephone station of claim 2 further comprising a summing amplifier for associating signals generating said first, second, third and fourth acoustic signal portions with output signals of said handset microphone and sound receiver, said summing amplifier supplying a logic input to said microprocesssor.

4. The telephone station of claim 3 further comprising an inverting amplifier coupled between said output of said handset microphone and sound receiver and an input of said summing amplifier.

5. The telephone station of claim 3 further comprising an integrator coupling an output of said summing amplifier and an input of said microprocessor.

6. The telephone station of claim 1 which includes ring means for providing acoustic ring signals of a first magnitude in response to received control signals, and wherein at least one of said first and second means is operative to provide at least some of said first, second, third and fourth acoustic signal portions between said acoustic ring signals.

7. The telephone station of claim 6 wherein said at least one of first and second means provides said at least some of said first, second, third and fourth acoustic signal portions with magnitudes less than said first magnitude of said acoustic ring signals.

8. A method for fault isolation in a system having first and second transmitting transducers and third and fourth receiving transducers comprising the steps of:

firstly activating said first transmitting transducer to produce first and second signal portions to said third and fourth receiving transducers respectively;

secondly activating said second transmitting transducer to produce third and fourth signal portions to said third and fourth receiving transducers respectively; and permutationally associating selected ones of electrical signals produced by said third and fourth receiving transducers in response to said first, second, third and fourth signal portions to determine the occurrence of faults in said first, second, third and fourth transducers;

whereby said first transmitting transducer may be considered defective if said first and second signal portions are not detected at said third and fourth receiving transducers, said second transmitting transducer may be considered defective if said third and fourth signal portions are not detected by said third and fourth receiving transducers, said third receiving transducer may be considered defective if said first and third signal portions are not detected thereby, and said fourth receiving transducer may be considered defective if said second and fourth signal portions are not detected thereby.

9. The method of claim 8 wherein said steps of firstly and secondly activating are carried out by means of a microprocessor controlled fault isolation system.

10. The method of claim 9 further comprising the steps of:

summing signals producing said first, second, third and fourth signal portions with an output of said third and fourth receiving transducers; and generating a logic input to said microprocessor in response thereto.

11. The method of claim 10 further comprising the step of:

inverting said output of said third and fourth receiving transducers prior to said step of summing.

12. The method of claim 11 further comprising the step of:

integrating said logic input to said microprocessor.

13. A telephone station having a fault isolation system for a telephone including a handset receiver and handset microphone and an associated sound source comprising:

first means for causing said handset receiver to produce a first acoustic signal to said handset microphone for detection by providing a corresponding electrical signal;

second means for causing said sound source to produce a second acoustic signal to said handset microphone for detection by providing a corresponding electrical signal; and logic means for permutationally associating selected ones of the corresponding electrical signals provided by said handset microphone in response to said first and second acoustic signals;

whereby said handset receiver and sound source may be considered defective if either said first or second acoustic signals is not respectively detected by said handset microphone, and said handset microphone may be considered defective if both said first and said second acoustic signals are not detected thereby.

14. The telephone station of claim 13 wherein said system comprises a microprocessor controlled fault isolation system.

15. The fault isolation system of claim 14 further comprising a summing amplifier for associating electrical signals producing said first and second acoustic signals with an output of said handset microphone, said summing amplifier supplying a logic input to said microprocessor.

16. The telephone station of claim 15 further comprising an inverting amplifier coupled between said output of said handset microphone and an input of said summing amplifier.

17. The telephone station of claim 15 further comprising an integrator coupling an output of said summing amplifier and an input of said microprocessor.

18. A method for fault isolation in a system having first and second transmitting transducers and a third receiving transducer comprising the steps of:

firstly activating said first transmitting transducer to produce a first signal to said third receiving transducer;

secondly activating said second transmitting transducer to produce a second signal to said third receiving transducer; and permutationally associating selected ones of electrical signals produced by said third transducer in response to said first and second signals to determine the occurrence of faults in said first, second and third transducers;

whereby said first and second transmitting transducers may be considered defective if either said first or second signal is not respectively detected by said third receiving transducer and said third receiving transducer may be considered defective if both said first and second signals are not detected thereby.

19. The method of claim 18 wherein said steps of firstly and secondly activating are carried out by means of a microprocessor controlled fault isolation system.

20. The method of claim 19 further comprising the steps of:

summing signals producing said first and second signals with an output of said third receiving transducer; and generating a logic input to said microprocssor in response thereto.

21. The method of claim 20 further comprising the step of:

inverting said output of said third receiving transducer prior to said step of summing.

22. The method of claim 20 further comprising the step of:

integrating said logic input to said microprocessor.

* * * * *